(12) United States Patent
Takanezawa et al.

(10) Patent No.: US 10,619,950 B2
(45) Date of Patent: Apr. 14, 2020

(54) STAINLESS STEEL AND METHOD OF MANUFACTURING THE SAME

(71) Applicant: TOYOTA JIDOSHA KABUSHIKI KAISHA, Toyota-shi (JP)

(72) Inventors: Yu Takanezawa, Nisshin (JP); Izuru Yamamoto, Toyota (JP); Keisuke Kadota, Toyota (JP); Hironori Aoyama, Toyota (JP); Toshiya Yamaguchi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 663 days.

(21) Appl. No.: 14/782,156

(22) PCT Filed: Apr. 2, 2014

(86) PCT No.: PCT/IB2014/000473
§ 371 (c)(1),
(2) Date: Oct. 2, 2015

(87) PCT Pub. No.: WO2014/162196
PCT Pub. Date: Oct. 9, 2014

(65) Prior Publication Data
US 2016/0060720 A1 Mar. 3, 2016

(30) Foreign Application Priority Data
Apr. 4, 2013 (JP) .................................. 2013-078750

(51) Int. Cl.
*F28F 21/08* (2006.01)
*F01N 13/16* (2010.01)
(Continued)

(52) U.S. Cl.
CPC ............ *F28F 21/082* (2013.01); *B32B 15/01* (2013.01); *B32B 15/011* (2013.01); *C21D 1/74* (2013.01);
(Continued)

(58) Field of Classification Search
CPC ....... B32B 15/00; B32B 15/01; B32B 15/011; C21D 1/773; C21D 1/74; C21D 6/00;
(Continued)

(56) References Cited

U.S. PATENT DOCUMENTS 1,306,690 A * 6/1919 Gillespie ................. C22C 38/04
101/401
3,623,901 A * 11/1971 Forstmann et al. ..... C21D 1/70
427/209
(Continued)

FOREIGN PATENT DOCUMENTS

CN 1576381 A 2/2005
CN 101076612 A 11/2007
(Continued)

OTHER PUBLICATIONS

JP 1999-11323504 Machine Translation (Year: 2019).*
JP 1990-259085 Machine Translation (Year: 2019).*

*Primary Examiner* — Alexandra M Moore
(74) *Attorney, Agent, or Firm* — Oblon, McClelland, Maier & Neustadt, L.L.P.

(57) ABSTRACT

A stainless steel that includes chromium and other alloying element as a plurality of alloying elements including: a base material layer including chromium of a specified chromium content necessary for forming a passive film or more; and a superficial layer including chromium at a lower chromium content than the chromium content contained in the base material layer, and the superficial layer including the other alloying elements at a same content of the other alloying (Continued)

element as the content of the other alloying element contained in the base material layer.

12 Claims, 8 Drawing Sheets

(51) Int. Cl.
| | |
|---|---|
| *C22C 38/44* | (2006.01) |
| *B32B 15/01* | (2006.01) |
| *C21D 6/00* | (2006.01) |
| *C23C 8/80* | (2006.01) |
| *C23C 8/04* | (2006.01) |
| *C22C 38/40* | (2006.01) |
| *C23C 10/60* | (2006.01) |
| *C23C 10/08* | (2006.01) |
| *C21D 9/46* | (2006.01) |
| *C23C 8/26* | (2006.01) |
| *C22C 38/22* | (2006.01) |
| *C22C 38/28* | (2006.01) |
| *C22C 38/18* | (2006.01) |
| *C21D 1/74* | (2006.01) |
| *C21D 1/773* | (2006.01) |
| *C22C 38/00* | (2006.01) |
| *C22C 38/06* | (2006.01) |
| *C22C 38/46* | (2006.01) |
| *C22C 38/50* | (2006.01) |
| *C22C 38/54* | (2006.01) |
| *C22C 38/58* | (2006.01) |

(52) U.S. Cl.
CPC ............. *C21D 1/773* (2013.01); *C21D 6/004* (2013.01); *C21D 6/005* (2013.01); *C21D 9/46* (2013.01); *C22C 38/002* (2013.01); *C22C 38/06* (2013.01); *C22C 38/18* (2013.01); *C22C 38/22* (2013.01); *C22C 38/28* (2013.01); *C22C 38/40* (2013.01); *C22C 38/44* (2013.01); *C22C 38/46* (2013.01); *C22C 38/50* (2013.01); *C22C 38/54* (2013.01); *C22C 38/58* (2013.01); *C23C 8/04* (2013.01); *C23C 8/26* (2013.01); *C23C 8/80* (2013.01); *C23C 10/08* (2013.01); *C23C 10/60* (2013.01); *F01N 13/16* (2013.01); *C21D 2211/001* (2013.01); *F01N 2510/08* (2013.01); *F01N 2510/10* (2013.01); *F01N 2530/04* (2013.01)

(58) Field of Classification Search
CPC .......... C21D 6/004; C21D 6/005; C21D 9/46; C21D 2211/001; C22C 38/00; C22C 38/002; C22C 38/06; C22C 38/18; C22C 38/22; C22C 38/28; C22C 38/40; C22C 38/44; C22C 38/46; C22C 38/50; C22C 38/54; C22C 38/58; C23C 8/00; C23C 8/04; C23C 8/26; C23C 8/80; C23C 10/08; C23C 10/60; C23C 8/14; F28F 21/08; F28F 21/081; F28F 21/082; F28F 21/083; F28F 19/00; F28F 19/06; F01N 13/16; F01N 2510/08; F01N 2510/10; F01N 2530/00; F01N 2530/02; F01N 2530/04; F16L 9/02

See application file for complete search history.

(56) References Cited

U.S. PATENT DOCUMENTS

| | | | | |
|---|---|---|---|---|
| 3,904,378 | A * | 9/1975 | Higbee | B22D 7/02 |
| | | | | 428/684 |
| 4,938,808 | A * | 7/1990 | Miura | C21D 8/0205 |
| | | | | 148/325 |
| 5,405,575 | A * | 4/1995 | Yazawa | C22C 38/18 |
| | | | | 420/42 |
| 5,783,622 | A * | 7/1998 | Sabata | B05D 7/14 |
| | | | | 524/444 |
| 2003/0000611 | A1 | 1/2003 | Takahashi | |
| 2005/0045251 | A1 | 3/2005 | Nishiyama et al. | |
| 2009/0098008 | A1 | 4/2009 | Amaya et al. | |
| 2013/0108426 | A1 * | 5/2013 | Zhu | C22C 38/58 |
| | | | | 415/200 |
| 2013/0206271 | A1 * | 8/2013 | Wieser | F01N 13/16 |
| | | | | 138/143 |

FOREIGN PATENT DOCUMENTS

| | | |
|---|---|---|
| EP | 1 498 508 | 1/2005 |
| EP | 1 840 237 | 10/2007 |
| JP | 2 54740 | 2/1990 |
| JP | 2 259085 | 10/1990 |
| JP | 4 131321 | 5/1992 |
| JP | 11 323504 | 11/1999 |
| JP | 2000 310161 | 11/2000 |
| JP | 2001 234300 | 8/2001 |
| JP | 2012 170961 | 9/2012 |
| JP | 2013 53769 | 3/2013 |

* cited by examiner

FIG. 1

GENERAL CORROSION

| No. | TREATMENT CONTENT | TREATMENT TEMPERATURE (°C) | TREATMENT PRESSURE (Pa) | CORROSION RESISTANCE | PITTING CORROSION DEPTH ($\mu m$) | | | | | | | | CONCENTRATION CHANGE OF EACH ELEMENT | | | |
|---|---|---|---|---|---|---|---|---|---|---|---|---|---|---|---|---|
| | | | | | pt1 | pt2 | pt3 | pt4 | pt5 | pt6 | pt7 | pt8 | Cr | Ni | Mo | Fe |
| 1 | UNTREATED | — | — | × | 207 | 125 | 64 | 131 | 139 | 76 | 150 | 174 | — | — | — | — |
| 2 | VACUUM HEATING | 1200 | $1.0 \times 10^{-2}$ | ○ | 9 | 14 | 7 | 9 | 14 | 9 | 14 | 19 | DECREASED | | | |
| 3 | VACUUM HEATING | 1250 | $1.0 \times 10^{-2}$ | ○ | 10 | 14 | 12 | 15 | 19 | 15 | 17 | 15 | DECREASED | | | |
| 4 | VACUUM HEATING | 1300 | $1.0 \times 10^{-2}$ | ○ | 18 | 14 | 6 | 6 | 17 | 7 | 9 | 5 | DECREASED | | | |
| 5 | VACUUM HEATING | 900 | $1.0 \times 10^{-2}$ | × | 63 | 37 | 27 | 18 | 51 | 49 | 39 | 39 | — | | | |
| 6 | VACUUM HEATING | 1250 | $1.0 \times 10^{3}$ | × | 68 | 63 | 77 | 74 | 71 | 121 | 79 | 58 | — | | | |
| 7 | VACUUM HEATING | 1200 | $1.0 \times 10^{1}$ | × | 138 | 94 | 133 | 80 | 62 | 150 | 66 | 79 | — | | | |
| 8 | NITRIDING | 1200 | $1.0 \times 10^{5}$ | × | 153 | 188 | 200 | 198 | 239 | 131 | 178 | 134 | DECREASED | DECREASED | DECREASED | DECREASED |
| 9 | OXIDIZING (IN ATMOSPHERE) | 1200 | $1.0 \times 10^{5}$ | × | 158 | 186 | 159 | 177 | 117 | 161 | 170 | 200 | DECREASED | DECREASED | DECREASED | DECREASED |

STAINLESS STEEL AND METHOD OF MANUFACTURING THE SAME

BACKGROUND OF THE INVENTION

1. Field of the Invention

The invention relates to a stainless steel and a method of manufacturing the same. In particular, the invention relates to a stainless steel suitable for exhaust system component that require anticorrosion against both of general corrosion and local corrosion, and a method of manufacturing the same.

2. Description of Related Art

In the stainless steel, anticorrosion against both of general corrosion and local corrosion is required. However, when the stainless steel is used for exhaust system parts of an internal combustion engine, it is required to prevent pitting corrosion from occurring even during the use of inferior fuel.

As such a stainless steel and a method of manufacturing the same, for example, there is a method in which a concentration ratio of chromium (Cr) and iron (Fe) is controlled in a superficial layer by mechanical polishing for forming surface unevenness and a chemical treatment for strengthening a passive film, and the ratio of chromium (Cr) concentration and iron (Fe) concentration in the superficial layer is increased more than that in a matrix phase (see, for example, Japanese Patent Application Publication No. 2012-170961 (JP 2012-170961 A)).

Further, a stainless steel in which a chromium concentration within 10 nm of a superficial layer is reduced and the acid pickling property is increased thereby (see Japanese Patent Application Publication No. 2001-234300 (JP 2001-234300 A), for example), a stainless steel that is surface modified by volatilizing manganese (Mn) that has a high vapor pressure among main constituent elements (see Japanese Patent Application Publication No. 04-131321 (JP 04-131321 A), for example), and a stainless steel in which a chromium content is set in the range of 0.25 to 11.5 wt % by weight and general corrosion resistance and local corrosion resistance are improved thereby (see Japanese Patent Application Publication No. 02-54740 (JP 02-54740 A), for example) are known.

SUMMARY OF THE INVENTION

However, in the conventional stainless steel and manufacturing method thereof as described above, there was a problem that the process is complicated and a manufacturing cost becomes high. Further, since the conventional stainless steel is exclusively improved in the corrosion resistance of a top surface, as a stainless steel that is used for exhaust system components of an internal combustion engine, sufficient corrosion resistance performance cannot be shown against both of the general corrosion and the local corrosion such as the pitting corrosion during use of inferior fuel, that is, there was a problem that the conventional stainless steel cannot be used for a long term under an environment where both of the general corrosion and the local corrosion occur.

For this, it is considered to use a so-called super stainless steel in which an alloying element is added at a concentration higher than that of the conventional stainless steel, or to apply a surface treatment such as cold spraying or plating. However, there was a problem that all of these result in high cost.

The present invention provides a low cost stainless steel that can be used for a long time also under an environment where both of the general corrosion and the local corrosion occur and a method of manufacturing the same.

According to a first aspect of the present invention, a stainless steel that contains chromium and other alloying elements as a plurality of alloying elements includes: a base material layer, the base material layer including chromium at a specified chromium content necessary for forming a passive film or more and a superficial layer, the superficial layer including chromium at a lower chromium content than that the chromium content contained in the base material layer, and the superficial layer including the other alloying elements at a same content of the other alloying element as the content of the other alloying element contained in the base material layer.

According to the aspect described above, in the stainless steel, since a chromium content of a superficial layer becomes lower than a chromium content in a base material layer, it is difficult to form a strong passive film in a superficial layer, and the corrosion resistance against the general corrosion is degraded. However, the local corrosion such as the pitting corrosion that proceeds with defects as a starting point on the assumption of existence of a strong film on the outermost surface can be prevented from occurring. Further, in the base material layer, a chromium content capable of forming a passive film is secured, therefore the general corrosion can effectively be suppressed from proceeding. That is, a superficial layer becomes a sacrificing layer against the local corrosion by significantly reducing only a chromium content in the superficial layer than that of the base material layer. However, with high corrosion resistance against the general corrosion as the stainless steel remained in the base material layer, the corrosion resistance against the local corrosion can be imparted to the superficial layer. Accordingly, sufficient corrosion resistance against both of the general corrosion and the local corrosion such as the pitting corrosion can be shown, without increasing an alloying element or applying a surface treatment.

In the aspect described above, the chromium content contained in the superficial layer may be lower than the specified chromium content.

According to the aspect described above, a strong passive film is not formed in the superficial layer. However, the pitting corrosion is more effectively suppressed from occurring.

Further, according to a second aspect of the present invention, a stainless steel includes: a base material layer, the base material layer including chromium and other alloying element as a plurality of alloying elements; and a superficial layer, the superficial layer including the chromium and other alloying element as a plurality of alloying elements, the chromium content contained in the superficial layer being less than the specified chromium content necessary for forming a passive film, a difference between the chromium content contained in the base material layer and the chromium content contained in the superficial layer being larger than a difference between the content of the other alloying element contained in the base material layer and the content of the other alloying element contained in the superficial layer.

According to the aspect described above, since the stainless steel has the chromium content of the superficial layer, which is less than the specified chromium content necessary for forming a passive film, the passive film is not formed in the superficial layer and the corrosion resistance against the general corrosion is degraded. However, the local corrosion such as the pitting corrosion which proceeds with defects as a starting point on the assumption of a strong film in the outermost surface can be suppressed from occurring. On the other hand, in the base material layer, since the chromium content capable of forming and regenerating a passive film is secured, the corrosion can effectively be suppressed from proceeding. That is, also in the present invention, the superficial layer can be a sacrificing layer against the local corrosion by significantly reducing only the chromium content in the superficial layer than that in the base material layer. However, while remaining high corrosion resistance against the general corrosion as the stainless steel in the base material layer, the corrosion resistance to the local corrosion can be imparted to the superficial layer. Accordingly, sufficient corrosion resistance against both of the general corrosion and the local corrosion such as the pitting corrosion can sufficiently be shown without increasing an amount of alloying element or applying surface treatment.

In the aspect described above, the other alloying element may be an additional element for improving the corrosion resistance of each of the base material layer and the superficial layer.

According to the aspect described above, although a strong passive film is not formed on the outermost surface of the superficial layer, the corrosion resistance in the superficial layer can be obtained by the other alloying elements and an advance speed of the general corrosion can be suppressed.

In the aspect described above, the chromium content contained in the superficial layer may be less than 11%.

According to the aspect described above, in the superficial layer, a passive film is not substantially formed, and the corrosion resistance against the general corrosion is degraded thereby. However, the local corrosion such as the pitting corrosion that proceeds with defects as a starting point on the assumption of existence of a strong film on the outermost surface can effectively be suppressed from occurring.

In the aspect described above, the superficial layer may form a part of an inner wall surface of an exhaust path of an internal combustion engine, and an exhaust system component may be formed with the base material layer and the superficial layer.

According to the aspect described above, a low cost exhaust system component that can show sufficient corrosion resistance against both of the general corrosion and the local corrosion such as the pitting corrosion can be obtained.

Further, according to a third aspect of the present invention, a method of manufacturing a stainless steel comprising: preparing a stainless steel raw material that includes a base material layer and a superficial layer, both of which include chromium and other alloying elements as a plurality of alloying elements; disposing at least the superficial layer of the stainless steel raw material under a low pressure environment, the low pressure environment is an environment of lower pressure than atmospheric pressure; and heating at least the superficial layer of the stainless steel raw material to a treatment temperature is higher than a vaporizing temperature of the chromium under the low pressure environment and lower than vaporizing temperatures of the other alloying elements under the low pressure environment.

According to the aspect described above, chromium is gradually vaporized from the superficial layer by heating the superficial layer of the stainless steel material at a treatment temperature that is higher than a vaporizing temperature of the chromium and lower than vaporizing temperatures of the other alloying elements under the low pressure environment. Therefore, a dechromization process in which in accordance with a treatment time of depressurization and heating, the chromium content in the superficial layer can be set lower than the chromium content in the base material layer proceeds. As a result, there is no need of increasing an alloying component or applying surface treatment, and irrespective of before and after assemble of a product that uses a stainless steel, a superficial layer that is a sacrificing layer against the local corrosion can readily be formed. Accordingly, there is no need of a complicated passivation treatment. Thus, a method of manufacturing a low-cost stainless steel that can show sufficient corrosion resistance against both of the general corrosion and the local corrosion such as the pitting corrosion can be obtained.

According to the aspect described above, by reducing an amount of chromium in the proximity of a surface, a stainless steel having a hybrid structure in which the superficial layer becomes an alloy steel that is strong against the local corrosion such as the pitting corrosion and contains other alloying elements, and the base material layer is strong against the general corrosion is manufactured. As a result, a high corrosion resistant stainless steel that can be used for a long term even under an environment where both of the general corrosion and the local corrosion may occur can be obtained.

Further, according to a fourth aspect of the present invention, a method of manufacturing a stainless steel comprising: preparing a stainless steel raw material that includes a base material layer containing chromium and other alloying elements as a plurality of alloying elements and a superficial layer that includes chromium and other alloying elements as a plurality of alloying elements; heating at least the superficial layer of the stainless steel raw material at a predetermined temperature; and exposing at least the superficial layer of the stainless steel raw material under an environment that is an environment of lower vapor pressure than a vapor pressure of the chromium under the predetermined temperature and higher than vapor pressures of the other alloying elements under the predetermined temperature.

According to the aspect described above, a dechromization treatment proceeds, in which the chromium content contained in the superficial layer can be set lower than the chromium content contained in the base material layer corresponding to a treatment time of depressurization and heating under a high temperature and low pressure environment. As a result, a method of manufacturing a low cost stainless steel that can show sufficient corrosion resistance against both of the general corrosion and the local corrosion such as the pitting corrosion can be obtained without increasing an amount of the alloying element and without applying the surface treatment. According to the method of manufacturing, a stainless steel having a hybrid structure in which the superficial layer becomes an alloy layer that is strong to the local corrosion such as the pitting corrosion and contains other alloying elements and the base material layer is strong against the general corrosion is manufactured.

Herein, a description to the effect that the stainless steel raw material is heated to a treatment temperature that is higher than a vaporizing temperature of chromium and lower than a vaporizing temperature of the other alloying elements under low pressure environment or the stainless steel raw material is put under a low pressure environment that is a vapor pressure of chromium corresponding to a heating temperature or less and higher than a vapor pressure of the other alloying elements under a high temperature heating state is taken. However, this means that the stainless steel raw material is dechromized in the ranges of the heating temperature and reduced pressure that are on a gas phase side from a vapor pressure curve of chromium in a vapor pressure diagram of metal and on a gas phase and solid phase side of the other alloying elements. In the aspect described above, the content of the other alloying element contained in the superficial layer is the same as those of the base material layer, and the chromium content contained in the superficial layer is lower than the chromium content in the base material layer.

According to the aspect described above, only the chromium content of the superficial layer is set significantly lower than that in the base material layer, and while remaining high corrosion resistance against the general corrosion as the stainless steel in the base material layer, the corrosion resistance against the local corrosion is imparted to the superficial layer. Thus, a low cost stainless steel that can be used for a long time even under an environment where both of the general corrosion and the local corrosion may occur and a method of manufacturing the same can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the present invention will be described with reference to the drawings.

FIG. 1 to FIG. 9 are diagrams for describing a stainless steel according to one embodiment of the present invention and a method of manufacturing the same.

First, a structure of a stainless steel of the present embodiment will be described.

Figure 1:
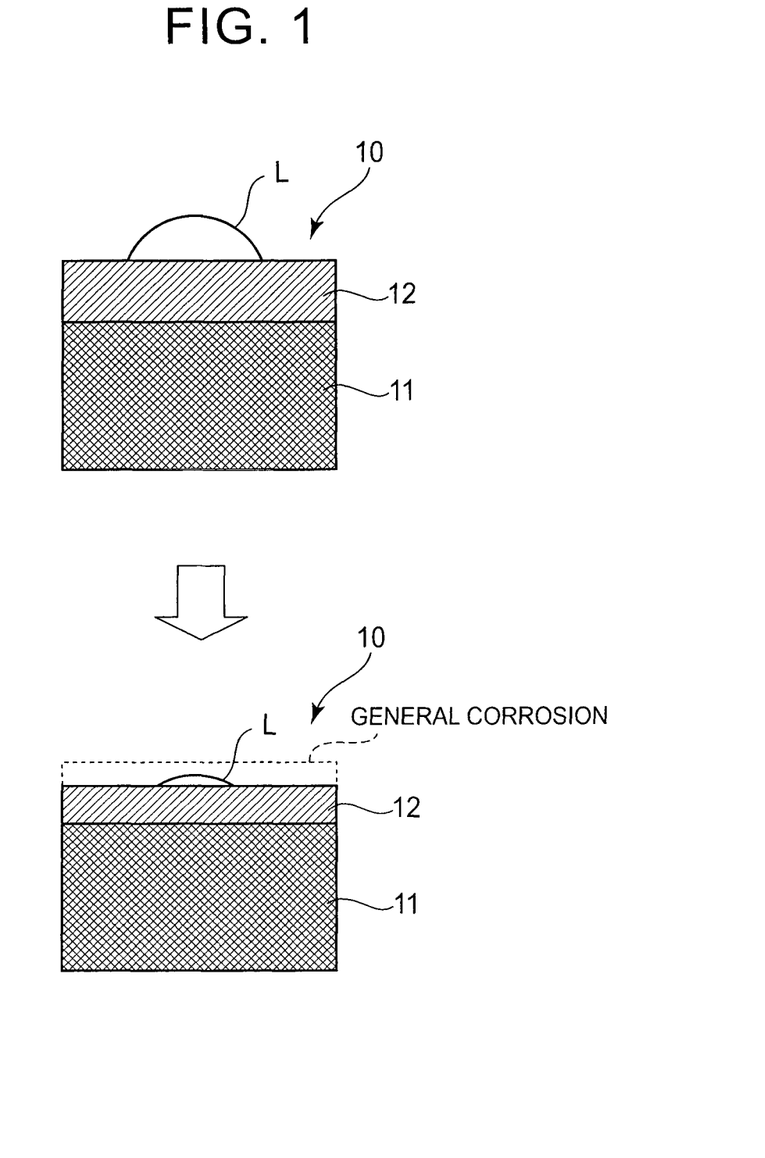
FIG. 1 is a diagram for describing a rough structure of a stainless steel according to an embodiment of the present invention and a corrosion resistance thereof.

The stainless steel according to the present embodiment includes chromium and other alloying elements, all of which are not shown in FIG. 1 as a plurality of alloying elements, and has SUS 316L (JIS Standard) that is an austenitic stainless steel, for example, as a raw material (host material).

As shown in FIG. 1, a stainless steel 10 according to the present embodiment includes a base material layer 11 in which chromium is contained at a specified chromium content necessary for forming a passive film or more and a superficial layer 12 having a predetermined layer thickness, which is integrally formed with the base material layer 11.

In the stainless steel 10, the superficial layer 12 forms a part of an inner wall surface of an exhaust path of an internal combustion engine, for example, a part of an inner wall surface of an EGR gas path which has an EGR cooler, and the base material layer 11 and the superficial layer 12 form an exhaust system component. However, it goes without saying that the stainless steel of the present invention may be one that is used for other exhaust system components other than the EGR cooler, and may be one that is used for other than exhaust system components.

The base material layer 11 is a layer of a raw material of the stainless steel 10, for example, SUS16L as it is, and includes, in addition to chromium (Cr) and iron (Fe), other alloying elements such as nickel (Ni), molybdenum (Mo) and nitrogen (N) each at a predetermined content. For example, the base material layer 11 includes 17.31 wt % of chromium (Cr), 12.09 wt % of nickel (Ni), 2.05 wt % of molybdenum (Mo), 0.008 wt % of nitrogen (N) and the balance of iron (Fe). In the description below, when the content is simply referred to by %, wt % is used as mass percent, and an element may simply be referred to by an element symbol.

Figure 2:
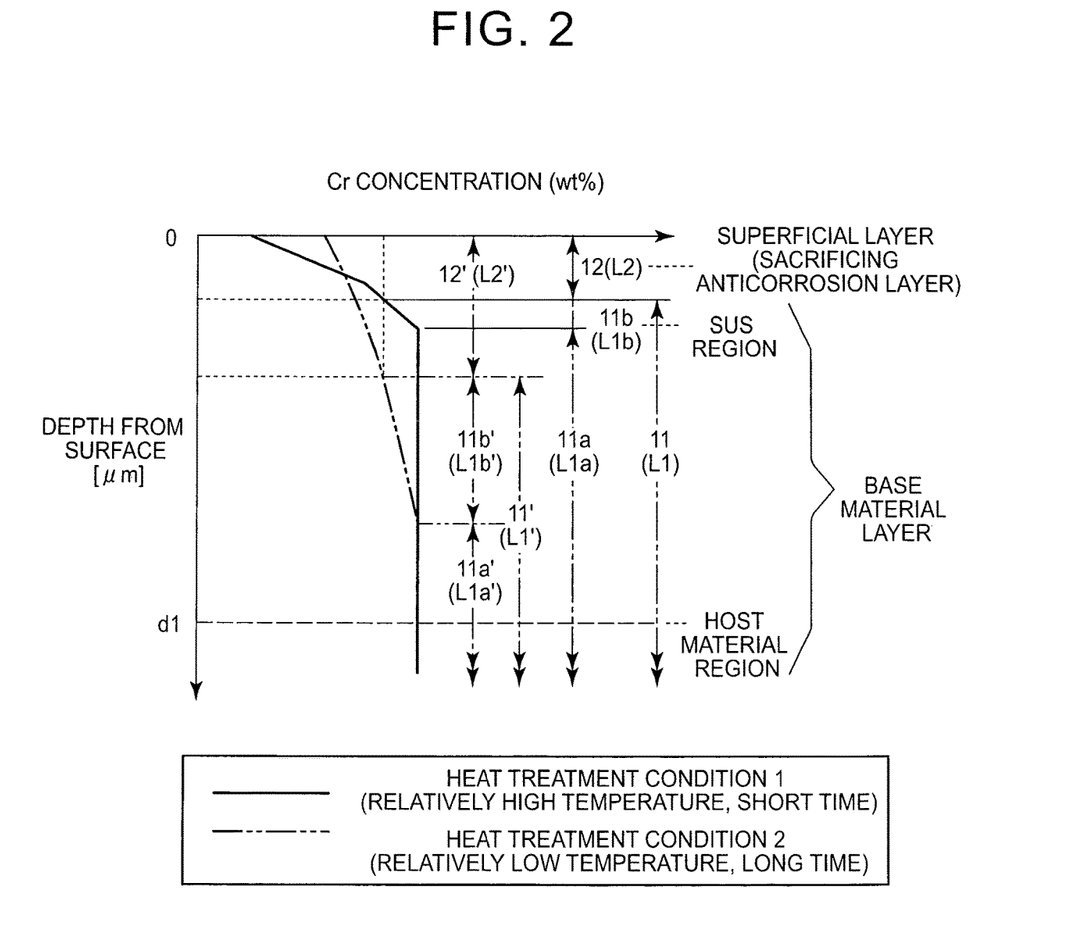
FIG. 2 is a diagram for describing a change of a chromium concentration distribution corresponding to a depth from an outermost surface due to a difference in a heat treatment condition during a dechromization process according to the embodiment of the present invention and a chromium concentration distribution for each thereof.
Figure 3A:
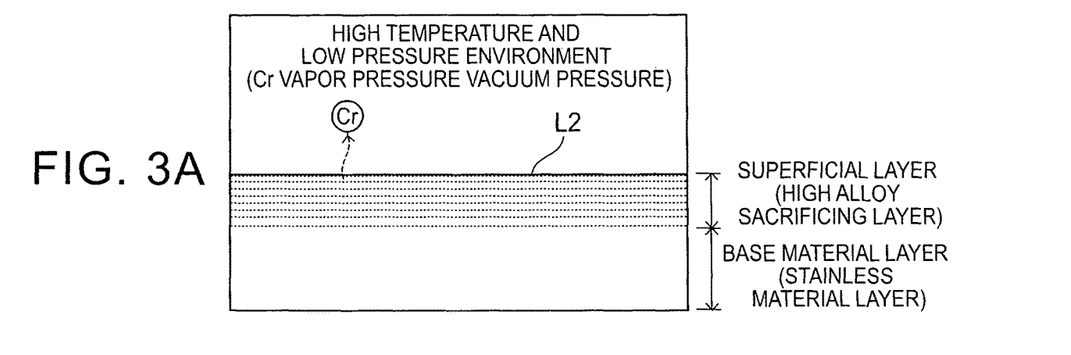
FIG. 3A is a diagram for describing a dechromization treatment of a stainless steel according to the embodiment of the present invention.

The superficial layer 12 is obtained by applying a dechromization treatment (see FIG. 3A described below in the range of a predetermined depth from a surface side thereof with respect to a raw material of the stainless steel 10. As shown in FIG. 2, the chromium content in the superficial layer 12 is lower than the chromium content of the base material layer 11. In addition, in the superficial layer 12, the content of each of the other alloying elements such as nickel (Ni), molybdenum (Mo) and nitrogen (N) contained in the stainless steel of the raw material is the same as that of the base material layer 11.

The chromium content in the superficial layer 12 is usually set low to a degree such that a passive film that is naturally formed on the outermost surface of the stainless steel cannot be substantially formed, and the specified chromium content necessary for forming the passive film is less than 11 wt %, for example. This corresponds to the lower limit chromium content necessary for a passive film to be naturally formed or to be self-repaired. Herein, by considering that an alloy containing 11% or more of chromium in iron (Fe) is called as a stainless steel, the specified chromium content is set to 11%. The specified chromium content may be set to another value close to 11%, for example, 11.5% or 12%, or 10.5% the same or less than that.

The superficial layer 12 has a layer thickness that is thicker by 1000 times or more, for example, a layer thickness of about 20 μm or more, when compared with a passive film that is formed on a surface of the stainless steel with a film thickness of about several tens of angstrom (angstrom=$10^{-10}$ m), that is, about several nanometers.

Figure 3B:
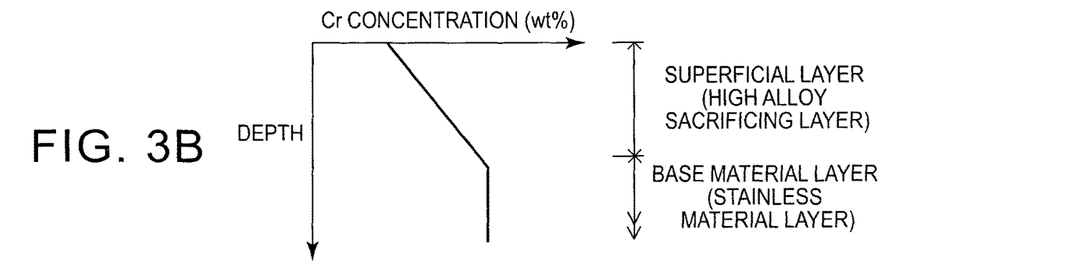
FIG. 3B is a graph that shows a chromium concentration distribution corresponding to a depth after the dechromization process according to the embodiment.
Figure 3C:
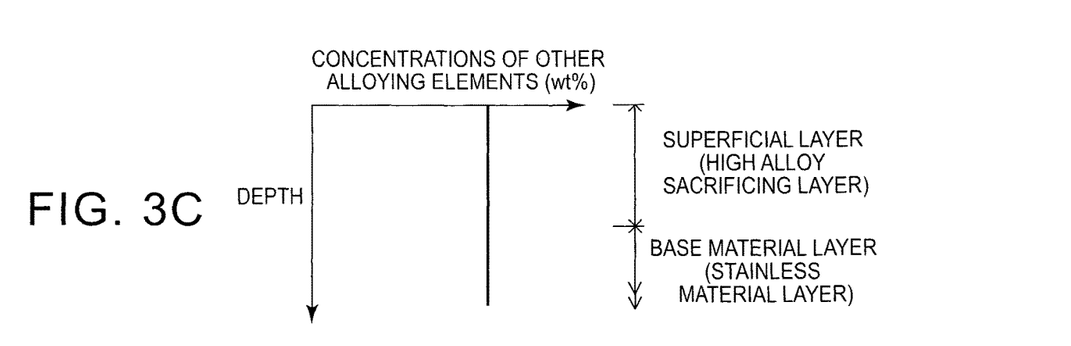
FIG. 3C is a graph that shows concentration distributions of other alloying elements after the dechromization treatment according to the embodiment.

As shown in FIG. 2 and FIG. 3B, the chromium content in the superficial layer 12 increases corresponding to a depth from the outermost surface layer of the superficial layer 12. Further, in a main portion 11a (a host material portion) of the base material layer 11, in which a depth from a surface becomes a specified depth d1 or more, the chromium content is nearly constant. That is, the main portion 11a (a host material portion) of the base material layer 11 corresponds to a host material region where contents of iron (Fe) and chromium (Cr) are approximately constant. On the other hand, in a portion 11b on the superficial layer side of the base material layer 11, the chromium content changes to be larger in accordance with the depth from the outermost surface in the range of a SUS region (stainless region) where the chromium content is larger than in the superficial layer 12 and smaller than in the main portion 11a of the base material layer 11.

Further, a change rate of the chromium content corresponding to the depth from the outermost surface (a position of a depth of a depth 0 in FIG. 2) is different between the superficial layer 12 and the portion 11b on the superficial layer side of the base material layer 11. That is, the change rate of the chromium content corresponding to a depth from the outermost surface layer in the superficial layer 12 (amount of change of the chromium content/amount of unit change of depth from an outermost surface) is larger than the change rate of the chromium content in the base material layer 11 corresponding to a depth from the outermost surface.

Thus, in the stainless steel 10 of the present embodiment, while the base material layer 11 has the chromium content that is the specified chromium content or more, which is necessary to form a passive film as the stainless steel, the superficial layer 12 has the chromium content that is less than the specified chromium content necessary for forming the passive film.

As a result, in the stainless steel 10 according to the present embodiment, a difference of the chromium content between the base material layer 11 and the superficial layer 12 is larger than a difference of contents of other alloying elements between the base material layer 11 and the superficial layer 12.

Other alloying elements such as nickel (Ni) and molybdenum (Mo) which are contained at the same content in both of the base material layer 11 and the superficial layer 12 are additional elements that can contribute to improve the corrosion resistance of each of the base material layer 11 and the superficial layer 12.

According to the present embodiment, as described above, by significantly reducing only the chromium content in the superficial layer 12 than that in the base material layer 11, a hybrid structure in which although the superficial layer 12 is a sacrificing layer against the local corrosion, the corrosion resistance against the local corrosion can be imparted to the superficial layer 12 while remaining high corrosion resistance against the general corrosion as the stainless steel in the base material layer 11 can be formed. Further, the superficial layer 12 is degraded in the corrosion resistance against the general corrosion by reducing the chromium content in the proximity of a surface. However, the superficial layer 12 has a certain degree of corrosion resistance against the general corrosion because it contains alloying elements (Ni, Mo) having high corrosion resistance as other alloying elements.

Next, a dechromization treatment for forming a stainless steel 10 from a stainless steel raw material thereof will be described. Herein, a stainless steel raw material is taken as a SUS 316L, which has a low carbon content and contains molybdenum (Mo). However, other stainless steels, for example, a SUS304 that is more general stainless steel can be used. Hereinafter, the stainless steel raw material is called a workpiece W (see FIG. 4). The workpiece W is formed into a raw material shape such as a plate or a flat piping, and becomes a raw material for exhaust system components having a large area exhaust contact surface in an exhaust system of an internal combustion engine and for components used in an exhaust contact portion of an EGR cooler for cooling an exhaust gas, for example. Further, by masking a portion other than a target portion of the dechromization treatment, the dechromization treatment of the workpiece W can be applied only on a target portion of the dechromization process, and also only the inside of the workpiece W can be processed.

Further, the workpiece W includes, as shown in FIG. 2 with a bracketed mark, a base material layer portion L1 and the superticial layer portion L2 corresponding to the base material layer 11 and the superficial layer 12 of the stainless steel 10.

Figure 4:
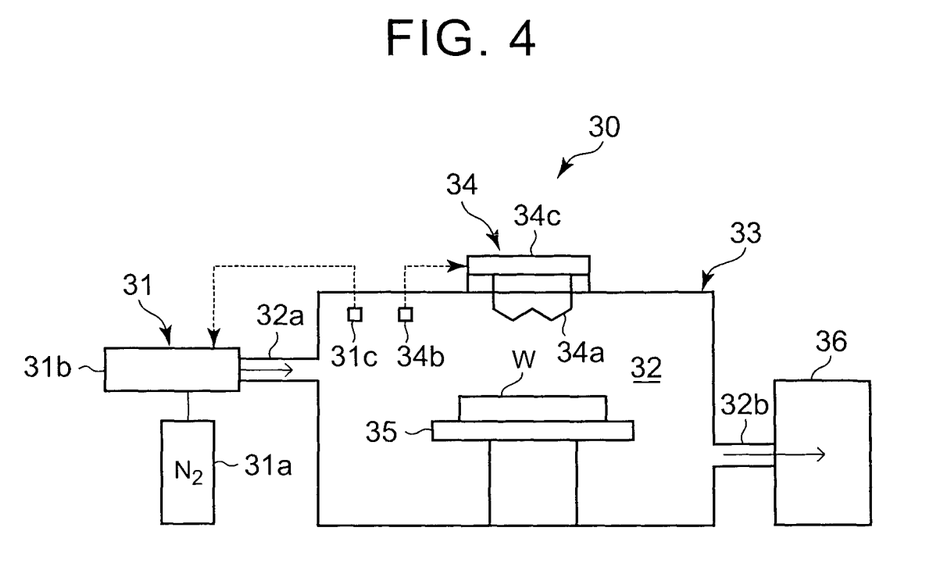
FIG. 4 is a schematic configuration diagram of a dechromization treatment system for performing a method of manufacturing a stainless steel according to the embodiment of the present invention.

The workpiece W is subjected to the dechromization treatment using a dechromization treatment system 30 such as shown in FIG. 4 and the stainless steel 10 is obtained.

The dechromization treatment system 30 is constructed by including an inert gas feeder 31, a vacuum heating furnace 33 and a vacuum exhaust device 36.

The inert gas feeder 31 includes an inert gas bomb 31a in which an inert gas, for example, a nitrogen gas ($N_2$) is compressed and filled, a feed control unit 31b for feeding the nitrogen gas from the inert gas bomb 31a into the vacuum heating furnace 33, and an atmosphere sensor 31c exposed in the vacuum heating furnace 33.

The inert gas bomb 31a is configured such that the inert gas, for example, the nitrogen ($N_2$) gas can continuously be fed to a feed control unit 31b side in the range of required feeding pressure and flow rate. The inert gas may be other gas other than nitrogen gas, for example, an argon (Ar) gas.

The feed control unit 31b is, though not detailed in the drawing, composed of a control valve and a control mechanism for variably controlling an opening thereof. The atmosphere sensor 31c is constructed by including an oxygen sensor that detects an oxygen concentration in the vacuum heating furnace 33, for example.

Further, the feed control unit 31b changes a feed amount of the nitrogen ($N_2$) gas based on detected information of the atmosphere sensor 31c according to a dechromization treatment condition determined in advance, for example. Thus, an oxygen concentration in the vacuum heating furnace 33 after vacuum exhausting can sufficiently be reduced.

The vacuum heating furnace 33 forms a dechromization treatment chamber 32 having a predetermined volume capable of housing the workpiece W inside thereof, a gas inlet port 32a to the dechromization treatment chamber 32 and a gas outlet port 32b from the dechromization treatment chamber 32 to the vacuum exhaust device 36. Further, to the vacuum heating furnace 33, a heating device 34 is installed and a support device 35 that supports the workpiece W in the dechromization treatment chamber 32 is disposed.

The dechromization treatment chamber 32 in the vacuum heating furnace 33 is thermally shielded from a space outside of the furnace by a heat-shielding wall that is not shown in the drawing and the workpiece W can be removed and inserted through the workpiece inlet port. Further, the gas inlet port 32a can reduce air (oxygen) in the dechromization treatment chamber 32 by introducing a nitriding gas into the inside of the dechromization treatment chamber 32 when the nitriding gas is fed from the inert gas feeder 31.

The heating device 34 includes a heater 34a for heating the inside of the dechromization treatment chamber 32, a temperature sensor 34b for detecting a temperature of the inside of the dechromization treatment chamber 32, and a heating control unit 34c for variably controlling an output of the heater 34a based on the heating condition where the heating temperature is set in advance and a detected temperature of the temperature sensor 34b. The heater 34a is embedded in an inner wall portion that extends to a broad range of the inner wall surface of the vacuum heating furnace 33 for example, and uniformly heats the inside of the dechromization treatment chamber 32, in particular, a space portion that is a region where the workpiece W is disposed. Further, the temperature sensor 34b detects a gas temperature of the inside of the dechromization treatment chamber 32, in particular, in the proximity of a portion where the workpiece W is subjected to the dechromization treatment or a temperature of the workpiece W.

The support device 35 supports the workpiece W in a state that can be dechromized in the dechromization treatment chamber 32 and can have an optional shape such as a table, a frame, a basket, or a hook, which supports at least one workpiece by many points. Further, the support device 35 may have a transportation function in combination, by which the workpiece W can be moved in a predetermined direction.

The vacuum exhaust device 36 is disposed on a downstream side (exhaust side) of the vacuum heating furnace 33 and composed of a vacuum pump for discharging air which intruded into the dechromization treatment chamber 32 during the installation of the workpiece W, a nitrogen gas from the inert gas feeder 31, and a residual gas after the dechromization treatment in the dechromization treatment chamber 32.

Herein, the heating device 34 is vacuum-exhausted by the vacuum exhaust device 36 to a low pressure of an extent such that compounds such as oxide or nitride of chromium are not substantially generated in the dechromization treatment chamber 32 of the vacuum heating furnace 33. Then, the heating device 34 can heat the workpiece W when at least the superficial portion L2 of the workpiece W is disposed under a low pressure environment having pressure lower than the atmospheric pressure. Further, the heating device 34 can heat the workpiece W at a treatment temperature that is higher than a vaporizing temperature of chromium (hereinafter, simply referred to also as Cr) under the low pressure environment and lower than a vaporizing temperature of other alloying elements (for example, Ni, Mo, Fe) under the low pressure environment.

That is, the heating device 34 can carry out the dechromization treatment in which a chromium content in a superficial portion L2 is set lower than a chromium content in the base material layer portion L1 with the contents of the other alloying elements such as Ni, Mo, Fe of the workpiece W in the superficial portion L2 maintaining the same as those in in the base material layer portion L1.

Figure 5:
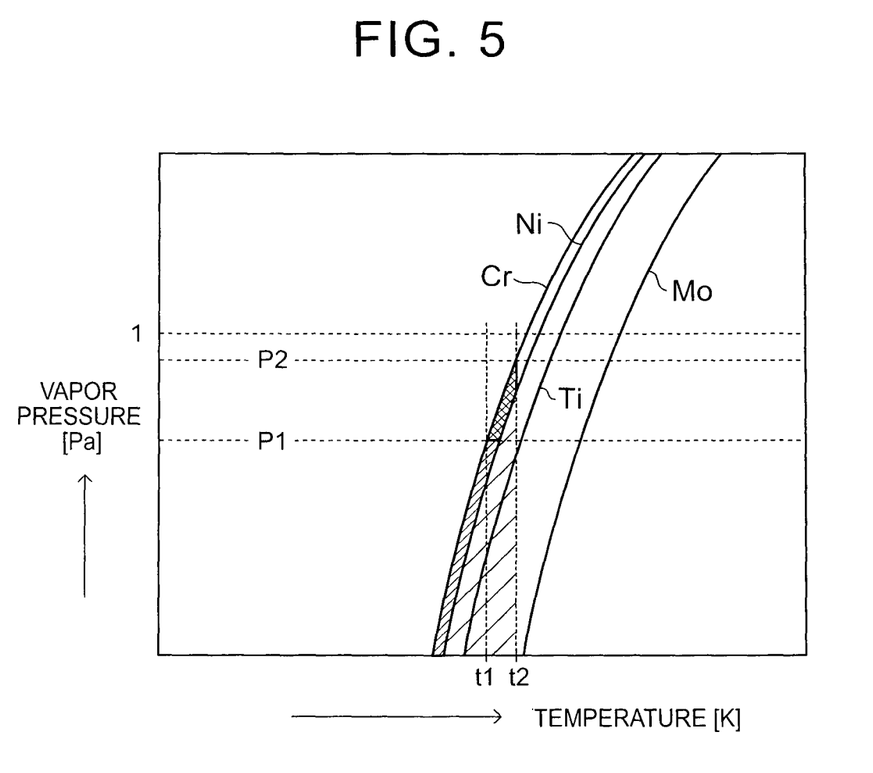
FIG. 5 is a vapor pressure curve illustrating a treatment condition of the dechromization treatment according to the embodiment of the present invention.

Specifically, as shown in FIG. 5, for example, a pressure range of vacuum used in the vacuum heating furnace 33 is set to a range from pressure P1 where a degree of vacuum is relatively high to pressure P2 where the degree of vacuum is relatively low (P1<$1.0\times10^{-2}$ [Pa]<P2). Then, a heating temperature t1 where a vapor pressure of Cr becomes pressure P1 and a heating temperature t2 where vapor pressure of Cr becomes pressure P2 are set on the basis of a vapor pressure curve such as FIG. 5. Further, a vapor pressure of Cr corresponding to a change of the heating temperature in the vacuum heating furnace 33 is specified. In the vapor pressure curve of FIG. 4, a unit of temperature is denoted by [K]. However, in the following description. [° C.] is used from the viewpoint of convenience.

A temperature at which the vapor pressure becomes about $1.0\times10^{-2}$ [Pa] is taken as a vaporizing temperature, then, the vaporizing temperature of Cr is 1205 [° C.], the heating temperature t1 is about 1000 [° C.], for example, and the heating temperature t2 is about 1300 [° C.], for example.

On the other hand, when a temperature at which the vapor pressure becomes about $1.0\times10^{-2}$ [Pa] is taken as the vaporizing temperature, then, the vaporizing temperature of iron (Fe) contained in the workpiece W is 1447 [° C.], and the vaporizing temperature of nickel (Ni) contained in the workpiece W is about 1510 [° C.]. Further, when titanium (Ti) and copper (Cu) are contained in the workpiece W, the vaporizing temperature of the titanium (Ti) is about 1547 [° C.] and the vaporizing temperature of copper (Cu) is about 1273 [° C.].

That is, as shown in the vapor pressure curve of FIG. 5, under a predetermined reduced pressure environment, for example, under a low pressure environment where the vapor pressure is $1.0\times10^{-2}$ [Pa], the vaporizing temperature of Cr in the stainless steel that forms the workpiece W becomes lower than the vaporizing temperatures of the other alloying elements (for example, nickel (Ni), molybdenum (Mo), titanium (Ti), and copper (Cu)) in the stainless steel.

Therefore, when the inside of the vacuum heating furnace 33 is maintained at a temperature that is higher than the vaporizing temperature of Cr and lower than the vaporizing temperatures of other alloying elements, for example, Ni (other alloying element Mo in FIG. 5 may be acceptable), under the low pressure environment, only Cr is gradually vaporized from the superficial surface of the workpiece W. Thus, a dechromization layer in which the shallower the depth from the outermost surface is, the lower the Cr content is, and as the depth from the outermost surface increases, the Cr content gradually increases can be formed. Alternatively, when the inside of the vacuum heating furnace 33 is depressurized to a pressure that is the vapor pressure of Cr or less and higher than the vapor pressures of the other alloying elements such as Ni and the like corresponding to the heating temperature, in a high temperature heating state at a predetermined heating temperature between the heating temperature t1 and t2, a dechromization layer where as the depth from the outermost surface increases, the Cr content gradually increases can be formed.

Further, by adjusting the pressure or the heating temperature in the low pressure environment in the vacuum heating furnace 33, a treatment speed of the dechromization treatment can be controlled. For example, when the pressure in the vacuum heating furnace 33 is increased to the pressure P2 side in the range of the working pressure (the vacuum is lowered) or the heating temperature is lowered to the t1 side in the range of variable control of the pressure and temperature in the vacuum heating furnace 33 shown by crosshatching in FIG. 5, as shown with a solid line in FIG. 2, a layer thickness (depth) of the superficial layer portion L2 corresponding to the superficial layer 12 can be reduced. On the other hand, when the pressure in the vacuum heating furnace 33 is decreased (increase the vacuum) to the pressure P1 side in the range of the working pressure or the heating temperature is increased to t2 side in the range of the variable control of the pressure and temperature in the vacuum heating furnace 33 shown by cross-hatching in FIG. 5, as shown with a two-dot chain line in FIG. 2, a layer thickness of the superficial layer portion L2' corresponding to the superficial layer 12' can be increased.

Next, a method of manufacturing a stainless steel of the present embodiment, which is carried out using the dechromization treatment system 30 will be described.

Figure 6:
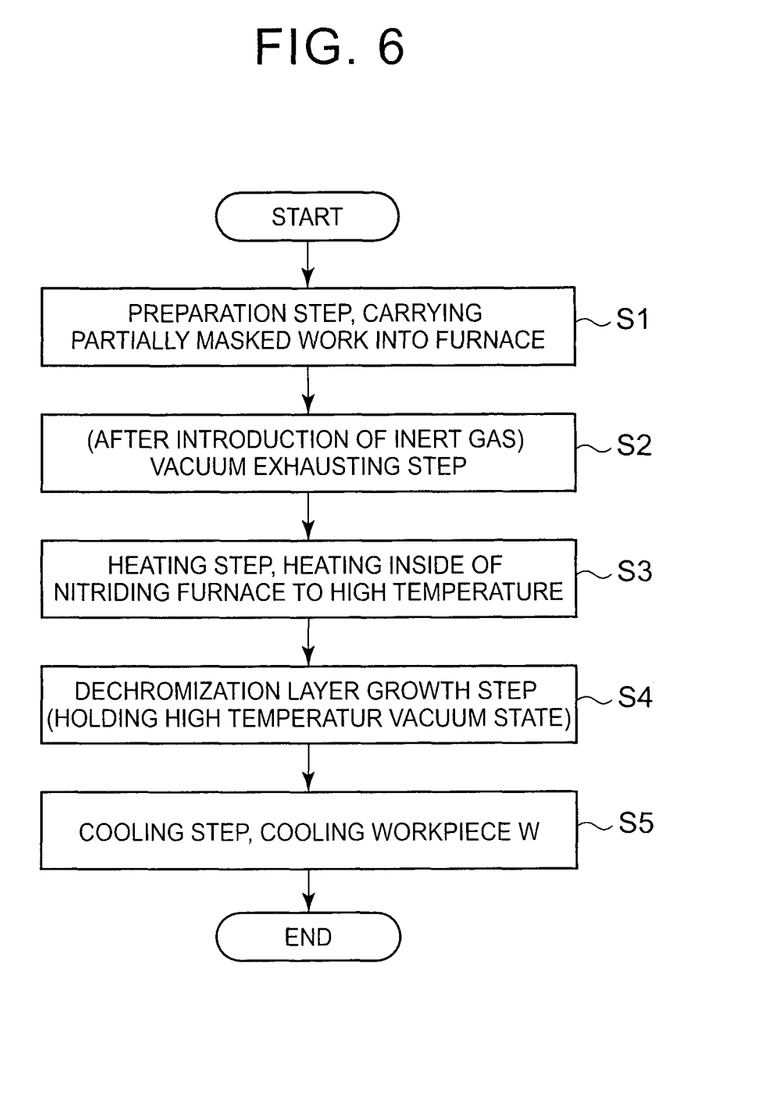
FIG. 6 is a flowchart that shows a rough process of the dechromization treatment of the stainless steel according to the embodiment of the present invention.

As shown in FIG. 6, the method of manufacturing a stainless steel of the present embodiment includes a preparation step S1, a vacuum exhausting step S2, a heating step S3, a dechromization layer growth step S4 due to holding of low pressure and high temperature, and a cooling step S5.

First, in the preparation step, a stainless steel raw material including a base material layer portion L that contains chromium and other alloying elements as a plurality of alloying elements in a layer and a superficial layer portion L2 that contains chromium and other alloying elements as a plurality of alloying elements in a layer is prepared as a workpiece W. When the workpiece W is a part of an EGR cooler, an article before the dechromization treatment of a heat exchange pipe, for example, a plurality of workpieces W forms at least an inner peripheral wall surface part of a heat exchange pipe with a stainless steel. Further, at least a target portion of the dechromization treatment of each of the workpieces W is cleansed and an oil component (in particular, carbon (C)) on a surface of the superficial layer portion L2 is removed such that a Cr compound is not formed. Further, the respective workpieces W may be carried in the vacuum heating furnace 33 in a state where a portion other than the target portion of the dechromization treatment is masked.

Next, in the vacuum exhausting step, the inside of the vacuum heating furnace 33 into which the workpiece W is carried in is evacuated by the vacuum exhaust device 36, and at least the superficial layer portion L2 of the workpiece W is disposed under a low pressure environment having pressure lower than the atmospheric pressure.

Further, in the heating step, the inside of the vacuum heating furnace 33 into which the workpiece W is carried in is heated to a treatment temperature that is higher than the vaporizing temperature of chromium under the low pressure environment and is lower than vaporizing temperatures of other alloying elements under the low pressure environment. The heating step can be carried out in parallel with the vacuum exhausting step or the steps may be partially overlapped with each other.

In the dechromization layer growth step, a heating state at the treatment temperature described above is maintained for a predetermined heating time. In this state, the inside of the vacuum heating furnace 33 is heated to a treatment temperature that is higher than the vaporizing temperature of Cr or lower than the vaporizing temperatures of other alloying elements such as Ni and the like under the low pressure environment, or the inside of the vacuum heating furnace 33 is depressurized, in the high temperature heating state at a predetermined heating temperature between the heating temperature t1 and t2, to a pressure that is the vapor pressure of Cr or less and higher than the vapor pressures of other alloying elements such as Ni and the like corresponding to the heating temperature.

In other words, the dechromization treatment of the workpiece W is performed in the range of the heating temperature and the reduced pressure, which is on a gas phase side from a vapor pressure curve of chromium and on a gas phase/solid phase side of the other alloying elements in the vapor pressure curve shown in FIG. 5.

In the dechromization layer growth step, the high temperature heating state under the low pressure environment as described above is established, and, as shown in FIG. 3A, chromium atoms (Cr shown by encircling with a circle in the drawing) gradually volatilize from a surface of the superficial layer portion L2 of the workpiece W, thus the dechromization treatment is performed. Thus, the chromium content in the superficial layer portion L2 is set to the content that is lower than the chromium content in the base material layer portion L1 corresponding to the depth from the outermost surface such that the chromium content becomes lower the closer to the outermost surface of the superficial layer portion L2 while maintaining the contents of other elements in the superficial layer portion L2 of the workpiece W the same as that of the base material layer portion L1.

During the heating time in the heating step and dechromization layer growth step, in the range of the variable control of the pressure and temperature in the vacuum heating furnace 33 shown with cross-hatching in FIG. 5, the pressure and heating temperature in the vacuum heating furnace 33 are controlled. Thus, the depth of the dechromization treatment corresponding to the layer thickness (depth) of the superficial layer portion L2 and the change rate of the chromium content corresponding to the depth from the surface thereof can be adjusted.

In the cooling step, a temperature of the superficial layer portion L2 and the like of the workpiece W is gradually decreased by natural heat dissipation, and a series of dechromization treatment comes to an end when a temperature of the workpiece W reaches a specified cooling completion temperature. Then, the workpiece W is taken out of the vacuum heating furnace 33 in a state of a stainless steel 10 in which the workpiece W has a superficial layer 12 in which only Cr content is decreased with respect to the base material layer 11 that is a host material.

Thus, in the present embodiment, the dechromization treatment is performed, in which only chromium is vaporized and volatilized by considering a difference of vapor pressures of a plurality of alloying elements in the workpiece W. That is, after carbon contained in an oil component on a surface of the workpiece W is removed such that a Cr compound is not formed, the range (the range of cross-hatching) of heating temperature and reduced pressure that is on a gas phase side than from the vapor pressure curve of chromium in the vapor pressure curve shown in FIG. 5 is specified, the stainless steel raw material is heated under low pressure and high temperature, and the dechromization treatment is carried out thereby.

The workpiece W processed by the dechromization treatment becomes the stainless steel 10 described above, and, in the superficial layer 12 thereof, the chromium concentration is reduced by vaporizing the Cr element among the constituent elements of the stainless steel raw material. Therefore, the superficial layer 12 serves as a sacrificing layer in which the corrosion resistance (corrosion resistance, anti-corrosion property) against the general corrosion is degraded.

Next, an operation of the present embodiment will be described.

In the stainless steel 10 of the present embodiment configured as described above, while the corrosion resistance against the general corrosion is degraded in the superficial layer 12, the pitting corrosion is effectively suppressed from occurring in the superficial layer 12. In particular, since the chromium content in the superficial layer 12 is less than the specified chromium content (11 wt %, for example) necessary for forming a passive film, the pitting corrosion on the superficial layer 12 side can more effectively be suppressed from occurring.

That is, since the chromium content of the superficial layer 12 is lower than the chromium content of the base material layer 11, it is difficult to form a strong passive film in the superficial layer 12, and the corrosion resistance against the general corrosion is degraded thereby. However, the local corrosion such as the pitting corrosion that proceeds with a defect as a starting point on the assumption of existence of a strong film of the outermost surface can be suppressed from occurring. On the other hand, in the base material layer 11, since the chromium content capable of forming a passive film is sufficiently secured, the corrosion can effectively be suppressed from proceeding. Accordingly, in the present embodiment, although the superficial layer 12 becomes a sacrificing layer against the local corrosion by significantly reducing only the chromium content in the superficial layer 12 than that in the base material layer 11, with the high corrosion resistance against the general corrosion remained in the base material layer 11 as a stainless steel, the corrosion resistance against the local corrosion can be imparted to the superficial layer 12.

In the present embodiment, thus, the superficial layer 12 of which chromium content is lower than the content of the base material layer 11 serves as a sacrificing layer against the local corrosion, and, since the base material layer 11 of a lower layer thereof is a stainless steel layer having a high chromium content, the corrosion resistance can be secured in two steps.

Further, in the present embodiment, irrespective of before or after the assembly of a product that uses a stainless steel, by processing parts or products thereof by the dechromization treatment, the superficial layer 12 that becomes a sacrificing layer can readily be formed. Accordingly, there is no need of a complicated passivation treatment, and there is no need of adopting a super stainless such as SUS836 in which an alloying metal (such as Ni and the like) is increased, or adding a surface treatment such as cold spraying or plating.

Furthermore, since the dechromization treatment for forming the superficial layer 12 is performed by using a difference of vapor pressures of a plurality of alloying elements in the stainless steel that becomes a raw material, the production cost necessary for the corrosion resistance can be suppressed.

Still furthermore, in the stainless steel 10 of the present embodiment, the contents of other alloying elements (Ni, Mo and so on) that are additional elements for improving the corrosion resistance other than chromium are maintained in the same level as in the base material layer 11 also in the superficial layer 12 that becomes a sacrificing layer. Thus, in addition to the function as a sacrificing layer of the superficial layer 12, the corrosion resistance/anticorrosion property in both of the superficial layer 12 and the base material layer 11 can be improved, and the proceeding speed of the general corrosion in the superficial layer 12 can effectively be suppressed.

In addition, in the present embodiment, the chromium content in the superficial layer 12 increases corresponding to a depth from the outermost surface and the chromium content in a main portion 11a of the base material layer 11 is constant. Further, in a SUS region portion 11b on a superficial layer 12 side of the base material layer 11, the chromium content changes in the range that is larger than in the superficial layer 12 and smaller than in the main portion 11a of the base material layer 11. Therefore, the corrosion resistance against the local corrosion in the superficial layer 12 and the corrosion resistance against the general corrosion in the base material layer 11 can surely be combined.

Further, the change rate of the chromium content corresponding to a depth from the outermost surface is different between the superficial layer 12 and the SUS region portion 11b on the superficial layer 12 side of the base material layer 11. Therefore, when a thickness of the superficial layer 12 up to the main portion 11a of the base material layer 11 changes as the general corrosion proceeds, the chromium content in the proximity of the outermost surface of the superficial layer 12 can be adjusted to be a chromium content value adequate for anticorrosion at each of depths from the outermost surface corresponding to a thickness thereof.

Still further, when the stainless steel of the present embodiment is used as an exhaust system component, since condensed water containing an exhaust component is generated or condensed, the component is used under an environment where the general corrosion and the local corrosion such as the pitting corrosion are likely to occur. However, when the stainless steel of the present embodiment is used in the exhaust system component, a low cost exhaust system component that can sufficiently show the corrosion resistance against both of the general corrosion and the local corrosion such as the pitting corrosion can be obtained.

By contrast, according to a manufacturing method of the present embodiment, the superficial layer 12 is subjected to the dechromization treatment by heating the superficial layer portion L2 of the workpiece W at a treatment temperature that is higher than a vaporizing temperature of chromium and lower than the vaporizing temperatures of other alloying elements under the low pressure environment. Alternatively/and, in addition to applying high temperature heating to the superficial portion L2 at a predetermined heating temperature, by putting under a low pressure environment that is lower pressure than a vapor pressure of chromium at the heating temperature and higher than vapor pressures of other alloying elements at the heating temperature, the superficial layer 12 can be dechromized.

Therefore, the chromium content of the superficial layer 12 can be set lower than the chromium content of the base material layer 11 corresponding to treatment times of depressurization and heating. As a result, there is no need of increasing alloying elements or applying a surface treatment. Moreover, irrespective of before and after the assembly of stainless steel articles, the superficial layer 12 that becomes a sacrificing layer against the local corrosion can be readily formed by applying the dechromization treatment to the superficial portion L2, thus, also a complicated passive film treatment and the like become unnecessary. Thus, a manufacturing method of a low cost stainless steel that can show sufficient corrosion resistance against both of the general corrosion and the local corrosion such as the pitting corrosion can be obtained.

Then, according to the manufacturing method, by reducing an amount of chromium in the proximity of a surface, a stainless steel having a hybrid structure, in which the superficial layer 12 is an alloy steel that is strong against the local corrosion such as the pitting corrosion and contains other alloying elements and the base material layer 11 is strong against the general corrosion can be manufactured. As a result, a high corrosion resistant stainless steel that can be used for a long time under an environment where both of the general corrosion and the local corrosion occur can be obtained.

Thus, according to the present embodiment, by significantly reducing only the chromium content in the superficial layer 12, and by remaining the high corrosion resistance against the general corrosion as the stainless steel in the base material layer 11, the corrosion resistance against the local corrosion is imparted to the superficial layer 12. Therefore, a low cost stainless steel that can be used for a long time under an environment where both of the general corrosion and the local corrosion occur and a manufacturing method thereof can be provided.

Next, a plurality of examples and comparative examples in which a method of manufacturing a stainless steel of the present embodiment differs therebetween will be described.

A plurality of test pieces was cut out from a raw material configuring the stainless steel 10, on a surface of each of thereof, a corrosion solution L (see FIG. 1) equivalent with or more than strong acidic condensed water containing an exhaust gas component of an internal combustion engine was dropped. Thereafter, the test piece was dried, and a corrosion test where the test piece was left under a high temperature and high humidity environment was carried out. Then, the test pieces of one example were cleansed, and a pitting corrosion depth (maximum erosion depth) of each thereof was measured.

Figure 7:
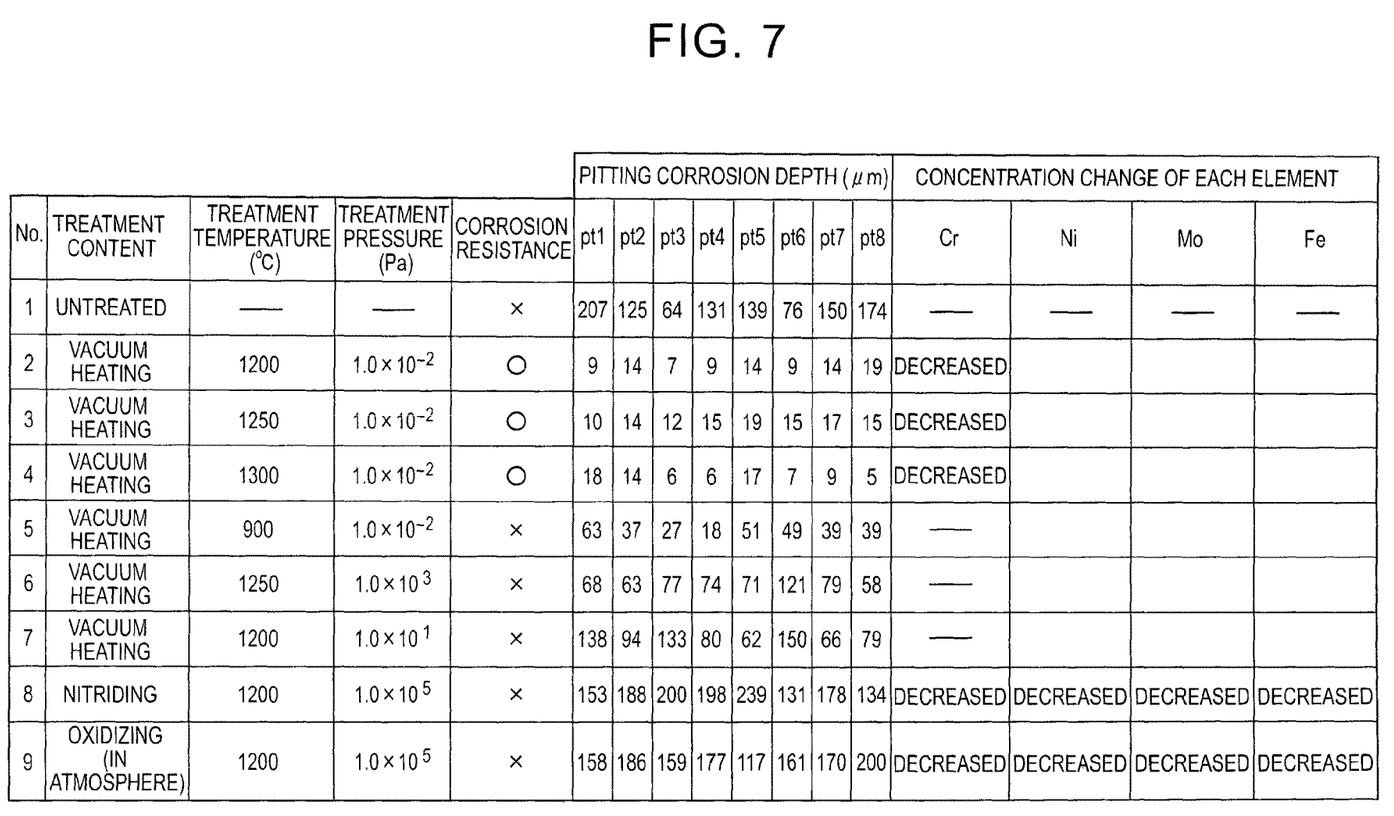
FIG. 7 is a list of treatment conditions and test results, in which heat treatment conditions of a plurality of examples according to the embodiment of the present invention and test results of the corrosion resistance thereof are shown by comparing with comparative examples.

A table in FIG. 7 shows heat treatment conditions of a plurality of Examples and Comparative Examples and results of the corrosion test thereof in comparison. No. 1 to 9 each in the table of FIG. 7 shows a test piece number, and No. 2, No. 3 and No. 4 each shows Examples 1, 2 and 3, and No. 1 and No. 5 to No. 9 each shows Comparative Examples 1 to 6.

Figure 9:
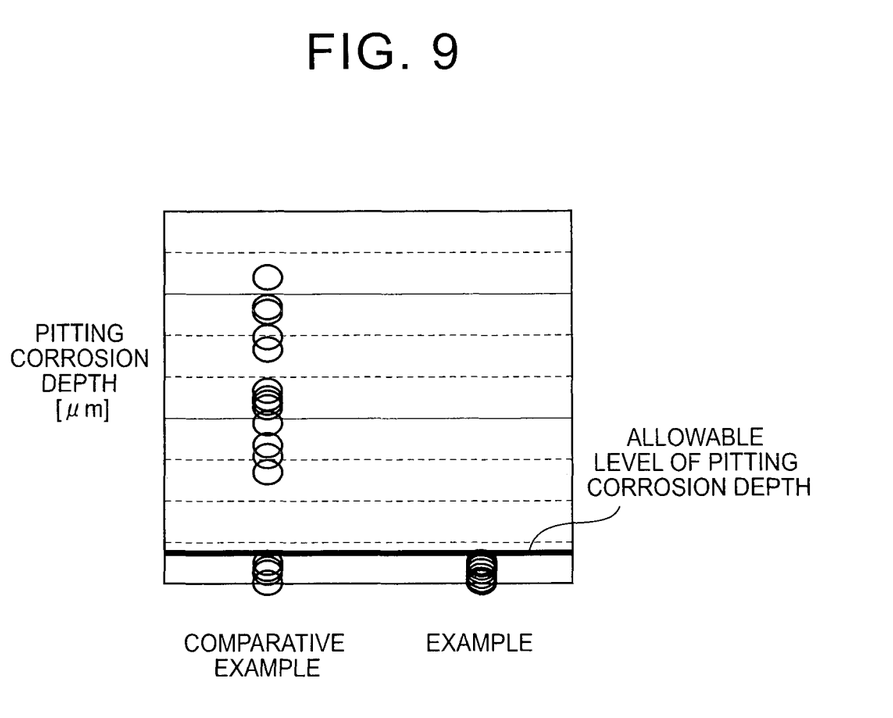
FIG. 9 is a diagram for describing corrosion test results of Examples 1 to 3 and Comparative Examples 1 to 6 of the present invention.

In FIG. 9, distributions of pitting corrosion depths after the corrosion test of Examples 1 to 3 and distributions of the pitting corrosion depths after the corrosion test of Comparative Examples 1 to 6 are shown in comparison.

In Example 1 represented by No. 2, the dechromization treatment was applied on the superficial layer portion L2 of the workpiece W that was formed of SUS316L at a treatment temperature of 1200 [° C.] and a treatment pressure of $1.0 \times 10^{-2}$ [Pa] for about 2 hours, and the superficial layer 12 having a layer thickness of 20 μm, in which the chromium content was reduced was formed.

According to results of the corrosion test on the test piece of Example 1, pitting corrosion depths of main corrosion pittings pt1-pt8 that were generated on surfaces of the test pieces were suppressed to 20 μm or less, and excellent corrosion resistance against pitting corrosion was found.

In Example 2 represented by No. 3, the dechromization treatment was applied on the superficial layer portion L2 of the workpiece W that was formed of SUS316L at a treatment temperature of 1250 [° C.] and a treatment pressure of $1.0 \times 10^{-2}$ [Pa] for about 1 hour, and the superficial layer 12 having a layer thickness of 20 μm, in which the chromium content was reduced was formed.

Figure 8A:
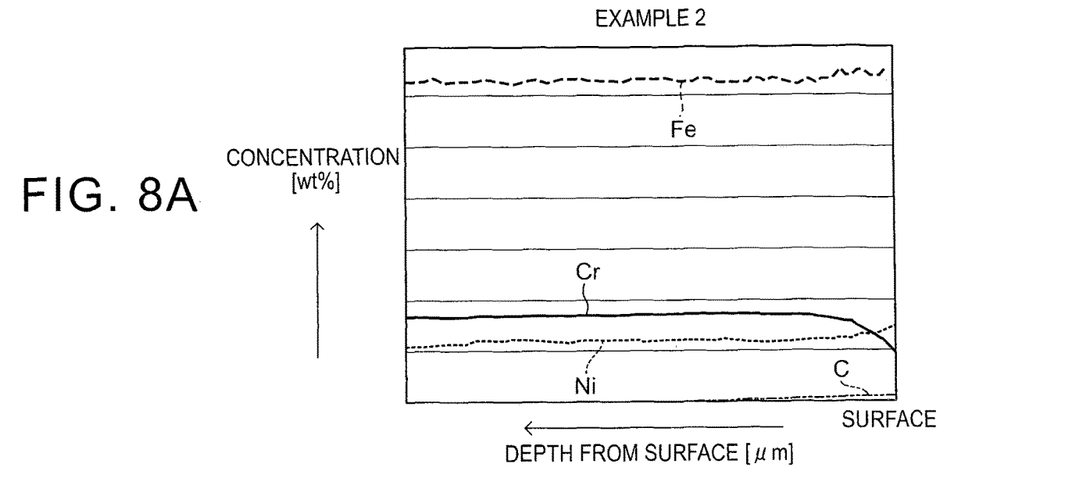
FIG. 8A is a graph that shows a concentration distribution for each of alloying elements corresponding to a depth from a surface after the dechromization treatment of the embodiment of the present invention.

In this case, as shown in FIG. 8A, the chromium content in the superficial layer portion L2 of the workpiece W was reduced. However, the contents of nickel (Ni) and iron (Fe) that are other alloying elements in the superficial layer portion L2 were the same as those in the base material layer portion L (SUS316L that is a low carbon stainless steel). Further, also carbon (C) was the same as in the base material layer portion L1.

According to results of the corrosion test on the test pieces of Example 2, the pitting corrosion depths of main corrosion pittings pt1-pt8 that were generated on surfaces of the test pieces were suppressed to 20 μm or less, that is, excellent corrosion resistance against the pitting corrosion was found.

In Example 3 represented by No. 4, the dechromization treatment was applied on the superficial layer portion L2 of the workpiece W that was formed of SUS316L at a treatment temperature of 1300 [° C.] and a treatment pressure of $1.0 \times 10^{-2}$ [Pa] for about 1 hour, and the superficial layer 12 having a layer thickness of 20 μm, in which the chromium content was reduced was formed.

According to results of the corrosion test on the test pieces of Example 3, the pitting corrosion depths of main corrosion pittings pt1-pt8 that were generated on surfaces of the test pieces were suppressed to 20 μm or less, that is, excellent corrosion resistance against the pitting corrosion was found.

In Comparative Example 1 represented by No. 1, the dechromization treatment was not applied on the superficial layer portion L2 of the workpiece W formed of a SUS316L and both of the superficial portion L2 and the base material layer portion L1 were remained as the raw material of the SUS316L.

According to results of the corrosion test on the test pieces of Comparative Example 1, among main corrosion pittings pt1-pt8 that were generated on surfaces of the test pieces, many thereof had the pitting corrosion depths exceeding 100 μm, that is, excellent corrosion resistance against the pitting was not found.

In Comparative Example 2 represented by No. 5, a low pressure- and high-temperature heat treatment was applied on the superficial layer portion L2 of the workpiece W formed of a SUS316L at a treatment temperature of 900 [° C.] and a treatment pressure of $1.0 \times 10^{-2}$ [Pa] for about 1 hour.

According to results of the corrosion test on the test pieces of Comparative Example 2, although the pitting corrosion depths of main corrosion pittings pt1 to pt8 that were generated on surfaces of the test pieces were improved compared with Comparative Example 1, the corrosion resistance against the pitting corrosion was insufficient.

In Comparative Example 3 represented by No. 6, a high-temperature heat treatment at a relatively low pressure was applied on the superficial layer portion L2 of the workpiece W formed of a SUS316L with a treatment temperature set at 1250 [° C.] and a treatment pressure set at $1.0 \times 10^{3}$ [Pa] for about 1 hour.

According to results of the corrosion test on the test pieces of Comparative Example 3, all of these test pieces were improved compared with Comparative Example 1. However, among main corrosion pittings pt1 to pt8 generated on surfaces of the test pieces, some thereof had the pitting corrosion depths exceeding 100 μm, that is, the corrosion resistance against the pitting corrosion was insufficient.

In Comparative Example 4 represented by No. 7, a low-pressure and high-temperature heat treatment was applied on the superficial layer portion L2 of the workpiece W formed of a SUS316L with a treatment temperature set at 1200 [° C.] and a treatment pressure set at $1.0 \times 10^{1}$ [Pa] for about 1 hour.

According to results of the corrosion test on the test pieces of Comparative Example 4, all of the test pieces were appeared to be improved compared with Comparative Example 1. However, among main corrosion pittings pt1 to pt8 generated on surfaces of the test pieces, some thereof had the pitting corrosion depths exceeding 100 μm, that is, the corrosion resistance against the pitting corrosion was insufficient.

Figure 8B:
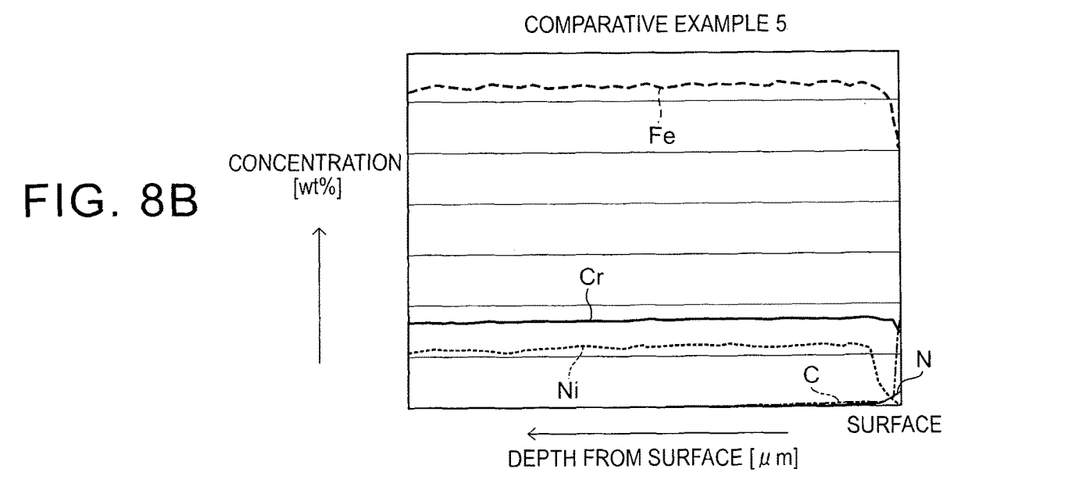
FIG. 8B is a graph that shows a concentration distribution for each of alloying elements corresponding to a depth from a surface after heat treatment of comparative example.

In Comparative Example 5 represented by No. 8, a normal nitriding treatment was applied on the superficial layer portion L2 of the workpiece W formed of a SUS316L with a treatment temperature set at 1200 [° C.] and a treatment pressure set at $1.0 \times 10^5$ [Pa]. In this case, the chromium content in the superficial layer portion L2 of the workpiece W was decreased. However, as shown in FIG. 8, also each of contents of nickel (Ni) and iron (Fe) that are other alloying elements in the superficial layer portion L2 was decreased.

According to results of the corrosion test on the test pieces of Comparative Example 5, the pitting corrosion depths of the main corrosion pittings pt1 to pt8 that were generated on surfaces of the test pieces exceeded 100 m, that is, the corrosion resistance against the pitting corrosion was insufficient.

(Comparative Example 6)

In Comparative Example 6 represented by No. 9, a normal oxidizing treatment was applied on the superficial layer portion L2 of the workpiece W formed of a SUS316L with a treatment temperature set at 1200 [° C.] and a treatment pressure set at the atmospheric pressure (roughly $1.0 \times 10^5$ [Pa]). In this case, the chromium content in the superficial layer portion L2 of the workpiece W was decreased. Further, also each of contents of nickel (Ni), molybdenum (Mo) and iron (Fe) that are other alloying elements in the superficial layer portion L2 was decreased.

According to results of the corrosion test on the test pieces of Comparative Example 6, the pitting corrosion depths of the main corrosion pittings pt1 to pt8 that were generated on surfaces of the test pieces exceeded 100 μm, that is, the corrosion resistance against the pitting corrosion was insufficient.

In one of embodiments described above, the vacuum heating furnace 33 was used to form a low pressure environment that can be heated to a high temperature. However, by heating the workpiece to a high temperature under other low pressure environment that does not generate a compound, only Cr in the material can be released outside of the material.

Further, in the dechromization layer growth step according to one embodiment, a heating state at a predetermined treatment temperature is held for a predetermined heating time, and under the state, the inside of the vacuum heating furnace 33 is heated to a treatment temperature that is higher than the vaporizing temperature of Cr and lower than the vaporizing temperatures of other alloying elements such as Ni and the like under a low pressure environment. Alternatively, the inside of the vacuum heating furnace 33 is depressurized to a pressure that is the vapor pressure of Cr or less and higher than vapor pressures of other alloying elements such as Ni and the like corresponding to the heating temperature in a high-temperature heating state at a predetermined heating temperature between the heating temperature t1 and t2. Further, among these, optional one or both thereof may appropriately be selected, or may be combined under different conditions (temperature and pressure).

Further, when there is a condition that allows maintenance of the contents of other alloying elements at the same degree as the contents thereof in the base material portion L1 while vaporizing and sublimating Cr from the superficial layer portion L2 of the workpiece W under a low pressure condition, it goes without saying that the pressure under a low pressure environment or a temperature at high heating can be changed according to an environment condition and an atmosphere.

Further, in one embodiment, the SUS316L was used as a stainless steel raw material that configures the workpiece W. However, it is also considered to use more general and cheaper stainless steel materials such as SUS304. It goes without saying that a stainless steel raw material that configures the workpiece W is not limited to an austenitic stainless steel.

It is also considered to use together or add a corrosion resistance improvement treatment such as partial plating and nitriding treatment to a dechromized component or stainless steel product.

Further, according to one embodiment described above, as a lower layer of the superficial layer 12 (or 12'; see FIG. 2) that becomes a sacrificing and corrosion resistant layer, the base material layer 11 (11') that includes a SUS region portion 11b (11b') on a superficial layer side, in which the chromium content is lower than that of the main portion 11a (11a') and higher than the specified chromium content, and the main portion 11a (11a') that is a host material was disposed. However, both of the superficial layer portion L2 (L2') of the workpiece W corresponding to the superficial layer 12 of the stainless steel 10 and the SUS region portion L1b (L1b') on the superficial layer side of the base material layer portion L1 (L1') may be dechromized to be less than the specified chromium content necessary to form a passive film. Further, by variably controlling the dechromization treatment condition, the change rate of the chromium content corresponding to a thickness of the superficial layer 12 and a depth from the outermost surface may be changed stepwise.

In the case where the thickness of the superficial layer 12 is changed, when the heat treatment condition such as a reduced pressure and a heating temperature (maintaining at a Cr vapor pressure or less or a Cr vaporizing temperature or more) is set to a high temperature and a short time, layer thicknesses of the superficial layer portion L2 that becomes the superficial layer 12 and the SUS region 11b on the superficial layer side of the base material layer 11 and a portion L1b on the superficial layer side become smaller. By contrast, when the treatment condition is set to a low temperature and a longer time, the layer thicknesses of the superficial layer portion L2' that becomes the superficial layer 12 and the SUS layer of the base material layer 11 and a portion L1b' on the superficial layer side tend to be larger.

As described above, the present invention can provide a low cost stainless steel that can be used for a long time under an environment where both of the general corrosion and the local corrosion occur, and a method of manufacturing the low cost stainless steel. The present invention like this is useful at large for a stainless steel suitable for exhaust system components for which the corrosion resistance against both of the general corrosion and the local corrosion such as the pitting corrosion are required and a method of manufacturing the same.

What is claimed is:

1. A stainless steel that contains chromium and other alloying element as a plurality of alloying elements, the stainless steel comprising:
   a base material layer including 11% or more of the chromium and the other alloying element; and
   a superficial layer including chromium at a chromium content greater than zero and less than a chromium content contained in the base material layer, and the superficial layer including the other alloying element at a same content of the other alloying element as the content of the other alloying element contained in the base material layer, wherein the stainless steel forms a part of an inner wall surface of an exhaust path of an internal combustion engine, and the superficial layer contacts exhaust gas in the exhaust path, and wherein the chromium content of the superficial layer increases corresponding to a depth from an outermost surface layer of the superficial layer toward the base material layer.

2. The stainless steel according to claim 1, wherein the chromium content contained in the superficial layer is lower than 11%.

3. The stainless steel according to claim 1, wherein the other alloying element is an additional element that improves a corrosion resistance of each of the base material layer and the superficial layer.

4. The stainless steel according to claim 1, wherein the base material layer and the superficial layer form an exhaust system component.

5. The stainless steel according to claim 1, wherein the other alloying element is at least one of nickel and molybdenum.

6. The stainless steel according to claim 1, wherein a base material of the superficial layer is made of steel.

7. A stainless steel comprising:
a base material layer including chromium and other alloying element as a plurality of alloying elements; and
a superficial layer that includes chromium and the other alloying element as a plurality of alloying elements, a chromium content contained in the superficial layer being greater than zero and less than 11%, the base material layer including chromium at a higher chromium content than the chromium content contained in the superficial layer, a difference between the chromium content contained in the base material layer and the chromium content contained in the superficial layer being larger than a difference between a content of the other alloying element contained in the base material layer and a content of the other alloying element contained in the superficial layer, wherein the stainless steel forms a part of an inner wall surface of an exhaust path of an internal combustion engine, and the superficial layer contacts exhaust gas in the exhaust path, and wherein the chromium content of the superficial layer increases corresponding to a depth from an outermost surface layer of the superficial layer toward the base material layer.

8. The stainless steel according to claim 7, wherein the other alloying element is an additional element that improves a corrosion resistance of each of the base material layer and the superficial layer.

9. The stainless steel according to claim 7, wherein the superficial layer forms a part of an inner wall surface of an exhaust path of an internal combustion engine, and the base material layer and the superficial layer form an exhaust system component.

10. The stainless steel according to claim 7, wherein the chromium content contained in the base material is 11% or more.

11. The stainless steel according to claim 7, wherein a base material of the superficial layer is made of steel.

12. The stainless steel according to claim 7, wherein the other alloying element is at least one of nickel and molybdenum.

* * * * *